(12) United States Patent
Kang et al.

(10) Patent No.: US 12,505,037 B2
(45) Date of Patent: Dec. 23, 2025

(54) GARBAGE COLLECTION METHOD AND APPARATUS

(71) Applicant: ELECTRONICS AND TELECOMMUNICATIONS RESEARCH INSTITUTE, Daejeon (KR)

(72) Inventors: Dong-Wook Kang, Daejeon (KR); Gae-Il An, Daejeon (KR); Hong-Il Ju, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 18/363,285

(22) Filed: Aug. 1, 2023

(65) Prior Publication Data

US 2024/0134790 A1 Apr. 25, 2024
US 2024/0232073 A9 Jul. 11, 2024

(30) Foreign Application Priority Data

Oct. 25, 2022 (KR) ........................ 10-2022-0138096

(51) Int. Cl.
*G06F 12/02* (2006.01)

(52) U.S. Cl.
CPC .. *G06F 12/0253* (2013.01); *G06F 2212/7205* (2013.01)

(58) Field of Classification Search
CPC .... G06F 3/0446; G06F 3/0416; G06F 21/577; G06F 3/0445; G06F 21/52; G06F 21/54; G06F 21/572; G06F 21/78; G06F 2203/04802; G06F 2221/033; G06F 12/0292; G06F 21/44; G06F 21/554; G06F 2203/04103; G06F 2221/034; G06F 3/0622; G06F 9/4401; G06F 1/1652; G06F 11/2273; G06F 11/263; G06F 11/36;
(Continued)

(56) References Cited

U.S. PATENT DOCUMENTS 8,327,109 B2  12/2012  Caspole
9,396,103 B2   7/2016  Sinclair et al.
(Continued)

FOREIGN PATENT DOCUMENTS

KR  10-2010-0034743 A   4/2010
KR     10-1626533 B1    6/2016
KR  10-2018-0119473 A  11/2018

*Primary Examiner* — Yong J Choe

(57) ABSTRACT

Disclosed herein are a garbage collection method and apparatus. The garbage collection method includes when an area dynamically allocated through a malloc( ) function or a new operator of a standard C library is deallocated through a free( ) function or a delete operator, inserting the deallocated area into a quarantine list, recording a base address and an end address of each of areas inserted into the quarantine list in a CSR_quarantined_chunks register, finding a physical address of a memory page used by a processor and searching data in the memory page for a value included in a quarantined area of the CSR_quarantined_chunks register, when a value included in the quarantined area is not present, setting a state flag bit of the register to 0, and deleting an area which the state flag bit is 0 from the quarantine list, and inserting the area into a free list.

12 Claims, 14 Drawing Sheets

(58) Field of Classification Search
CPC .............. G06F 12/0253; G06F 12/1458; G06F 13/385; G06F 2009/45575; G06F 21/53; G06F 21/556; G06F 21/57; G06F 21/602; G06F 21/606; G06F 21/6218; G06F 21/6245; G06F 21/6254; G06F 21/6263; G06F 21/72; G06F 21/73; G06F 2212/1052; G06F 2212/7205; G06F 2221/2105; G06F 2221/2117; G06F 2221/2149; G06F 3/0631; G06F 3/0673; G06F 9/3005; G06F 9/30058; G06F 9/30076; G06F 9/30101; G06F 9/345; G06F 9/3806; G06F 9/3836; G06F 9/4406; G06F 9/45533; G06F 9/45558; G06F 11/1441; G06F 11/3656; G06F 11/366; G06F 11/3668; G06F 11/3692; G06F 11/3696; G06F 12/023; G06F 12/0868; G06F 12/0873; G06F 12/26; G06F 21/566; G06F 21/64; G06F 21/70; G06F 21/82; G06F 2201/805; G06F 2212/251; G06F 2221/2129; G06F 3/0659; G06F 3/0679; G06F 8/654; G06F 8/658; G06F 9/4411; G06F 9/524

USPC ........................................................ 711/203
See application file for complete search history.

(56) References Cited

U.S. PATENT DOCUMENTS

| | | |
|---|---|---|
| 10,776,491 B2 | 9/2020 | Kim et al. |
| 10,884,873 B2 | 1/2021 | Hwang et al. |
| 11,630,767 B2 | 4/2023 | Pandurangan et al. |
| 2003/0056149 A1* | 3/2003 | Hue .................... G06F 9/52 |
| | | 714/E11.211 |
| 2015/0227414 A1 | 8/2015 | Varma |
| 2018/0074885 A1* | 3/2018 | Giloni .................. G06F 3/0673 |
| 2021/0004456 A1* | 1/2021 | Savry .................... G06F 9/24 |
| 2023/0063568 A1* | 3/2023 | Hassan ................ G06F 3/0622 |

* cited by examiner

```
char func1 (char *ptr0)
{
  char *lptr ptr0 + 1;
  ////////////////////////     (2)
  return *lptr;
}
void func0 (void)
{
   char *ma0, *ma1, *ma2;
   char *ptr;
   ma0 = malloc(16);
   ma1 = malloc(16);
   ma2 = malloc(16);
   ptr = ma0 + 1;
   ////////////////////////    (1)
   Func1(mal + 1);
   *(char**)ma2 = ptr;
   ////////////////////////    (3)
   free(ma0);
   free(ma1);
   free(ma2);
   ////////////////////////    (4)
   return ptr;
}
int main()
{
   char *ptr, *ma3;
   ptr = func0();
   ////////////////////////    (5)
   ma3 malloc(16);
   *ptr = 1;
   ////////////////////////    (6)
}
```

| | | | | |
|---|---|---|---|---|
| HEAP | 0x20000 | | 0 | |
| | 0x20008 | | 0 | |
| | 0x20010 | | 0 | MA0 |
| | 0x20018 | | 0 | |
| | 0x20020 | | 0 | |
| | 0x20028 | | 0 | |
| | 0x20030 | | 0 | MA1 |
| | 0x20038 | | 0 | |
| | 0x20040 | | 0 | |
| | 0x20048 | | 0 | |
| | 0x20050 | | 0 | MA2 |
| | 0x20058 | | 0 | |
| | ...... | | | |
| | ...... | | | |
| | ...... | | | |
| | ...... | | | |
| | 0xffff87c8 | 0x20032 | 1 | LPTR   <-- SP |
| | 0xffff87d0 | | 0 | RET |
| | 0xffff87d8 | 0x20011 | 1 | PTR |
| | 0xffff87e8 | 0x20050 | 1 | MA2 |
| | 0xffff87f0 | 0x20030 | 1 | MA1 |
| | 0xffff87f8 | 0x20010 | 1 | MA0 |
| | 0xffff8800 | | 0 | RET |
| | 0xffff8808 | | 0 | MA3 |
| STACK | 0xffff8810 | | 0 | PTR |
| | 0xffff881f | | 0 | RET |

FIG. 10

| | Address | Value | Flag | Label | |
|---|---|---|---|---|---|
| HEAP | 0x20000 | | 0 | | |
| | 0x20008 | | 0 | | |
| | 0x20010 | | 0 | MA0 | |
| | 0x20018 | | 0 | | |
| | 0x20020 | | 0 | | |
| | 0x20028 | | 0 | | |
| | 0x20030 | | 0 | MA1 | |
| | 0x20038 | | 0 | | |
| | 0x20040 | | 0 | | |
| | 0x20048 | | 0 | | |
| | 0x20050 | 0x20011 | 1 | MA2 | |
| | 0x20058 | | 0 | | |
| | ...... | | | | |
| | 0xffff87c8 | 0x20032 | 0 | | |
| | 0xffff87d0 | | 0 | | |
| | 0xffff87d8 | 0x20011 | 1 | PTR | <-- SP |
| | 0xffff87e8 | 0x20050 | 1 | MA2 | |
| | 0xffff87f0 | 0x20030 | 1 | MA1 | |
| | 0xffff87f8 | 0x20010 | 1 | MA0 | |
| | 0xffff8800 | | 0 | RET | |
| | 0xffff8808 | | 0 | MA3 | |
| STACK | 0xffff8810 | | 0 | PTR | |
| | 0xffff881f | | 0 | RET | |

FIG. 11

| Address | Value | Flag | Label | |
|---|---|---|---|---|
| 0x20000 | | 0 | | |
| 0x20008 | | 0 | | |
| HEAP 0x20010 | | 0 | MA0 | |
| 0x20018 | | 0 | | |
| 0x20020 | | 0 | | |
| 0x20028 | | 0 | | |
| 0x20030 | | 0 | MA1 | |
| 0x20038 | | 0 | | |
| 0x20040 | | 0 | | |
| 0x20048 | | 0 | | |
| 0x20050 | 0x20011 | 0 | MA2 | |
| 0x20058 | | 0 | | |
| ...... | | | | |
| ...... | | | | |
| ...... | | | | |
| ...... | | | | |
| 0xffff87c8 | 0x20032 | 0 | | |
| 0xffff87d0 | | 0 | | |
| 0xffff87d8 | 0x20011 | 1 | PTR | <-- SP |
| 0xffff87e8 | 0x20050 | 1 | MA2 | |
| 0xffff87f0 | 0x20030 | 1 | MA1 | |
| 0xffff87f8 | 0x20010 | 1 | MA0 | |
| 0xffff8800 | | 0 | RET | |
| 0xffff8808 | | 0 | MA3 | |
| STACK 0xffff8810 | | 0 | PTR | |
| 0xffff881f | | 0 | RET | |

CSR_HEAP_BASE_      0x20000

CSR_HEAP_END_      0x2ffff

CSR_QUARANTINED_CHUNKS

| | END | BASE | D |
|---|---|---|---|
| CHUNK0 | 0x2001f | 0x20010 | 1 |
| CHUNK1 | 0x2003f | 0x20030 | 1 |
| CHUNK2 | 0x2005f | 0x20050 | 1 |

FIG. 12

| Address | Value | Flag | Label | | |
|---|---|---|---|---|---|
| 0x20000 | | 0 | | | |
| 0x20008 | | 0 | | | |
| 0x20010 | | 0 | MA0 | | |
| 0x20018 | | 0 | | | |
| 0x20020 | | 0 | | | |
| 0x20028 | | 0 | | | |
| 0x20030 | | 0 | MA1 | | |
| 0x20038 | | 0 | | | |
| 0x20040 | | 0 | | | |
| 0x20048 | | 0 | | | |
| 0x20050 | 0x20011 | 0 | MA2 | | |
| 0x20058 | | 0 | | | |
| ...... | | | | | |
| ...... | | | | | |
| ...... | | | | | |
| ...... | | | | | |
| 0xffff87c8 | 0x20032 | 0 | | | |
| 0xffff87d0 | | 0 | | | |
| 0xffff87d8 | 0x20011 | 0 | PTR | <-- | SP |
| 0xffff87e8 | 0x20050 | 0 | MA2 | | |
| 0xffff87f0 | 0x20030 | 0 | MA1 | | |
| 0xffff87f8 | 0x20010 | 0 | MA0 | | |
| 0xffff8800 | | 0 | RET | | |
| 0xffff8808 | | 0 | MA3 | | |
| 0xffff8810 | 0x20011 | 1 | PTR | | |
| 0xffff881f | | 0 | RET | | |

CSR_HEAP_BASE      0x20000

CSR_HEAP_END      0x2ffff

CSR_QUARANTINED_CHUNKS

| | END | BASE | D |
|---|---|---|---|
| CHUNK0 | 0x2001f | 0x20010 | 1 |
| CHUNK1 | 0x2003f | 0x20030 | 0 |
| CHUNK2 | 0x2005f | 0x20050 | 0 |

FIG. 13

| Address | Value | D | Label |
|---|---|---|---|
| 0x20000 | | 0 | |
| 0x20008 | | 0 | |
| 0x20010 | 0x0100 | 0 | MA0 |
| 0x20018 | | 0 | |
| 0x20020 | | 0 | |
| 0x20028 | | 0 | |
| 0x20030 | | 0 | MA1 |
| 0x20038 | | 0 | |
| 0x20040 | | 0 | |
| 0x20048 | | 0 | |
| 0x20050 | 0x20011 | 0 | MA2 |
| 0x20058 | | 0 | |
| ...... | | | |
| ...... | | | |
| ...... | | | |
| ...... | | | |
| 0xffff87c8 | 0x20032 | 0 | |
| 0xffff87d0 | | 0 | |
| 0xffff87d8 | 0x20011 | 0 | PTR |
| 0xffff87e8 | 0x20050 | 0 | MA2 |
| 0xffff87f0 | 0x20030 | 0 | MA1 |
| 0xffff87f8 | 0x20010 | 0 | MA0 |
| 0xffff8800 | | 0 | RET |
| 0xffff8808 | 0x20030 | 1 | MA3   <-- SP |
| 0xffff8810 | 0x20011 | 1 | PTR |
| 0xffff881f | | 0 | RET |

CSR_HEAP_BASE_  0x20000

CSR_HEAP_END_  0x2ffff

CSR_QUARANTINED_CHUNKS

|  | END | BASE | D |
|---|---|---|---|
| CHUNK0 | 0x2001f | 0x20010 | 1 |
| CHUNK1 | | | |
| CHUNK2 | | | |

FIG. 14

GARBAGE COLLECTION METHOD AND APPARATUS

CROSS REFERENCE TO RELATED APPLICATION

This application claims the benefit of Korean Patent Application No. 10-2022-0138096, filed Oct. 25, 2022, which is hereby incorporated by reference in its entirety into this application.

BACKGROUND OF THE INVENTION

1. Technical Field

The present disclosure relates generally to a garbage collection method and apparatus, which may quarantine a dynamically allocated memory area in which a dangling pointer is present, and may reallocate only a dynamic memory area in which no dangling pointer is present.

2. Description of the Related Art

Generally, when a program is created in low-level languages such as C and C++, code for allocation and deallocation needs to be explicitly inserted in order to use a dynamic memory allocation function. However, when a complicated program of performing allocation and deallocation of multiple dynamic memory areas is created, a programmer may make mistakes such as by failing to deallocate dynamic memory that is no longer used (memory leak), by using previously deallocated dynamic memory (use-after-free), or by deallocating again the previously deallocated dynamic memory (double free). Such mistakes may be vulnerabilities enabling attacks to be made, thus resulting in large economic or social damage.

Among these vulnerabilities, the most representative vulnerability may be 'use-after-free'. The use-after-free vulnerability may result in the vulnerabilities of accessing the previously deallocated dynamic memory area, and may enable attacks of accessing a significant feature due to the vulnerabilities when the deallocated dynamic memory area is reallocated and utilized for the significant feature.

A representative feature of defending the attacks using the 'use-after-free' vulnerability is garbage collection. Garbage collection is the feature that is provided in high-level languages such as Java or Python and that finds and deallocates a memory area that is no longer used among dynamically allocated memory areas. Due to this garbage collection, the feature of explicitly deallocating dynamic memory such as a free( ) function is not provided and makes it impossible to have a dangling pointer. Consequently, languages such as Java and Python are not susceptible to the "use-after-free" vulnerability as well.

However, a problem may arise in that it is difficult to use garbage collection due to reasons such as performance overhead in low-level languages such as C or C++.

SUMMARY OF THE INVENTION

Accordingly, the present disclosure has been made keeping in mind the above problems occurring in the prior art, and an object of the present disclosure is to provide a garbage collection method and apparatus for performing garbage collection for low-level languages such as C or C++.

In accordance with an aspect of the present disclosure to accomplish the above object, there is provided a garbage collection method, including, when an area dynamically allocated through a malloc( ) function or a new operator of a standard C library is deallocated through a free( ) function or a delete operator, inserting the deallocated area into a quarantine list, recording a base address and an end address of each of areas inserted into the quarantine list in a CSR_quarantined_chunks register, finding a physical address of a memory page used by a processor and searching pieces of data in the memory page for a value included in a quarantined area of the CSR_quarantined_chunks register, when it is determined that a value included in the quarantined area of the CSR_quarantined_chunks register is not present, setting a state flag bit of the CSR_quarantined_chunks register to 0, and deleting an area which the state flag bit of the CSR_quarantined_chunks register is 0 from the quarantine list, and inserting the area into a free list in which reallocation is enabled.

The CSR_quarantined_chunks register may include a virtual base address, a virtual end address, and a state flag bit of each quarantined memory area.

The state flag bit may have a value of 1 in a quarantined state, and may be changed to 0 when no dangling pointer is determined to be present.

The tag value may be configured such that a 1-bit tag value is added for each specific size of a memory or such that a shadow memory is allocated and used as a tag value.

The tag value may be initialized to 0 and is set to 1 when a value between values of CSR_HEAP_BASE and CSR_HEAP_END is written to the memory in execution.

A tag value of a heap area may be initialized to 0 when a specific area is deallocated through a free( ) function.

A tag value of a stack area may be initialized for a stack area that is no longer used while changing a stack pointer value when a function is returned.

In accordance with another aspect of the present disclosure to accomplish the above object, there is provided a garbage collection apparatus, including a memory configured to store a control program for performing garbage collection, and a processor configured to execute the control program stored in the memory, wherein the processor is configured to, when an area dynamically allocated through a malloc( ) function or a new operator of a standard C library is deallocated through a free( ) function or a delete operator, insert the deallocated area into a quarantine list, record a base address and an end address of each of areas inserted into the quarantine list in a CSR_quarantined_chunks register, find a physical address of a memory page used by the processor, search pieces of data in the memory page for a value included in a quarantined area of the CSR_quarantined_chunks register, when it is determined that a value included in the quarantined area of the CSR_quarantined_chunks register is not present, set a state flag bit of the CSR_quarantined_chunks register to 0, delete an area which the state flag bit of the CSR_quarantined_chunks register is 0 from the quarantine list, and insert the area into a free list in which reallocation is enabled.

The CSR_quarantined_chunks register may include a virtual base address, a virtual end address, and a state flag bit of each quarantined memory area.

The processor may be configured to control the state flag bit such that the state flag bit has a value of 1 in a quarantined state and is changed to 0 when no dangling pointer is determined to be present.

The processor may be configured to perform control such that a 1-bit tag value is added for each specific size of a memory or such that a shadow memory is allocated and used as a tag value.

The processor may be configured to perform control such that the tag value is initialized to 0 and is set to 1 when a value between values of CSR_HEAP_BASE and CSR_HEAP_END is written to the memory in execution.

The processor may be configured to perform control such that a tag value of a heap area is initialized to 0 when a specific area is deallocated through a free( ) function.

The processor may be configured to perform control such that a tag value of a stack area is initialized for a stack area that is no longer used while changing a stack pointer value when a function is returned.

BRIEF DESCRIPTION OF THE DRAWINGS

The above and other objects, features and advantages of the present disclosure will be more clearly understood from the following detailed description taken in conjunction with the accompanying drawings, in which:

FIG. 8 is a diagram illustrating an example of a program according to an embodiment;

FIGS. 9, 10, 11, 12, 13, and 14 are diagrams illustrating stacks, heaps, and tag values in a program and illustrating changes in the CSR_quarantined_chunks register corresponding thereto.

DESCRIPTION OF THE PREFERRED EMBODIMENTS

Figure 1:
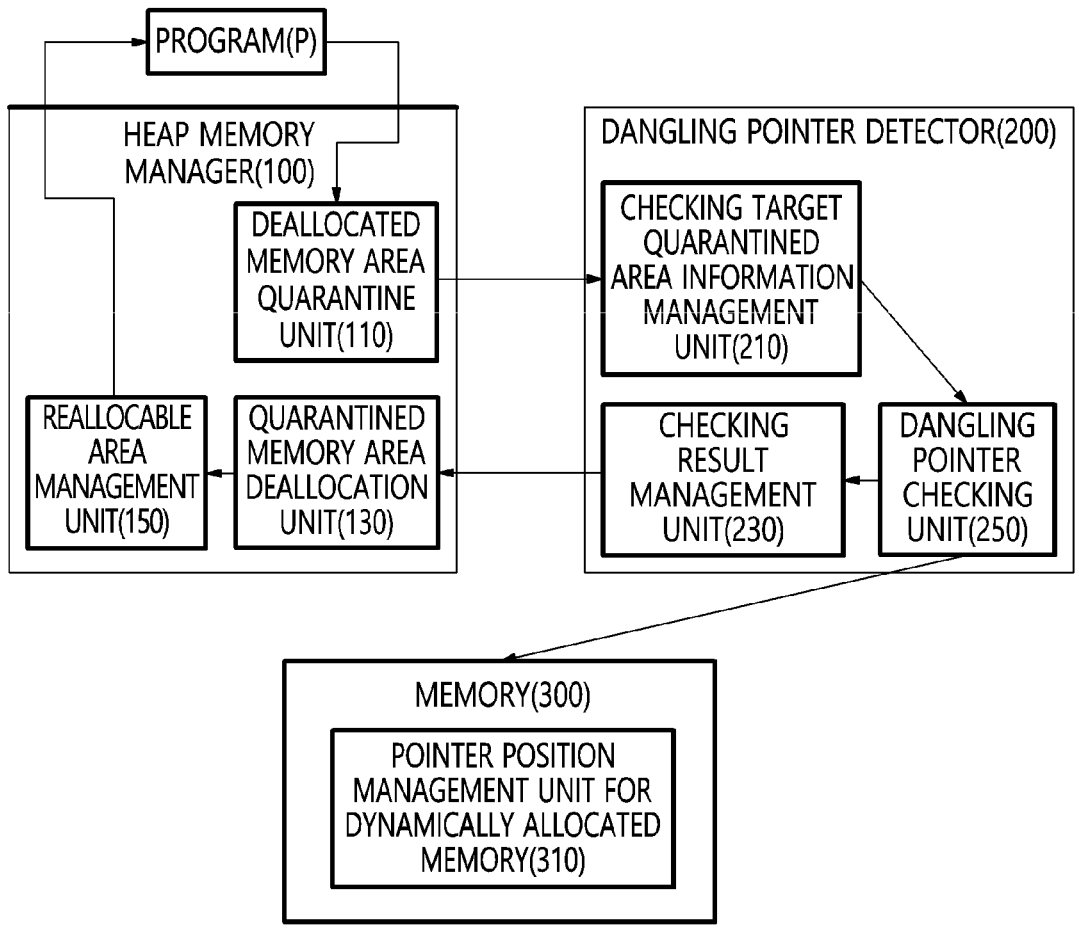
FIG. 1 is a block diagram illustrating a garbage collection apparatus according to an embodiment.

Advantages and features of the present disclosure and methods for achieving the same will be clarified with reference to embodiments described later in detail together with the accompanying drawings. However, the present disclosure is capable of being implemented in various forms, and is not limited to the embodiments described later, and these embodiments are provided so that this disclosure will be thorough and complete and will fully convey the scope of the present disclosure to those skilled in the art. The present disclosure should be defined by the scope of the accompanying claims. The same reference numerals are used to designate the same components throughout the specification.

It will be understood that, although the terms "first" and "second" may be used herein to describe various components, these components are not limited by these terms. These terms are only used to distinguish one component from another component. Therefore, it will be apparent that a first component, which will be described below, may alternatively be a second component without departing from the technical spirit of the present disclosure.

The terms used in the present specification are merely used to describe embodiments, and are not intended to limit the present disclosure. In the present specification, a singular expression includes the plural sense unless a description to the contrary is specifically made in context. It should be understood that the term "comprises" or "comprising" used in the specification implies that a described component or step is not intended to exclude the possibility that one or more other components or steps will be present or added.

Unless differently defined, all terms used in the present specification can be construed as having the same meanings as terms generally understood by those skilled in the art to which the present disclosure pertains. Further, terms defined in generally used dictionaries are not to be interpreted as having ideal or excessively formal meanings unless they are definitely defined in the present specification.

In the present specification, each of phrases such as "A or B", "at least one of A and B", "at least one of A or B", "A, B, or C", "at least one of A, B, and C", and "at least one of A, B, or C" may include any one of the items enumerated together in the corresponding phrase, among the phrases, or all possible combinations thereof.

Embodiments of the present disclosure will now be described in detail with reference to the accompanying drawings. Like numerals refer to like elements throughout, and overlapping descriptions will be omitted.

FIG. 1 is a block diagram illustrating a garbage collection apparatus according to an embodiment.

Referring to FIG. 1, the garbage collection apparatus according to the embodiment may include a heap memory manager 100 and a dangling pointer detector 200.

The heap memory manager 100 may include a deallocated memory area quarantine unit 110, a quarantined memory area deallocation unit 130, and a reallocable area management unit 150. The dangling pointer detector 200 may include a checking target quarantined area information management unit 210, a checking result management unit 230, and a dangling pointer checking unit 250.

When program P deallocates (or frees) a dynamically allocated memory area through a free( ) function, a delete operator, or the like, the heap memory manager 100 may insert the deallocated memory area into a quarantine list so that the deallocated memory area is not reallocated.

Figure 2:
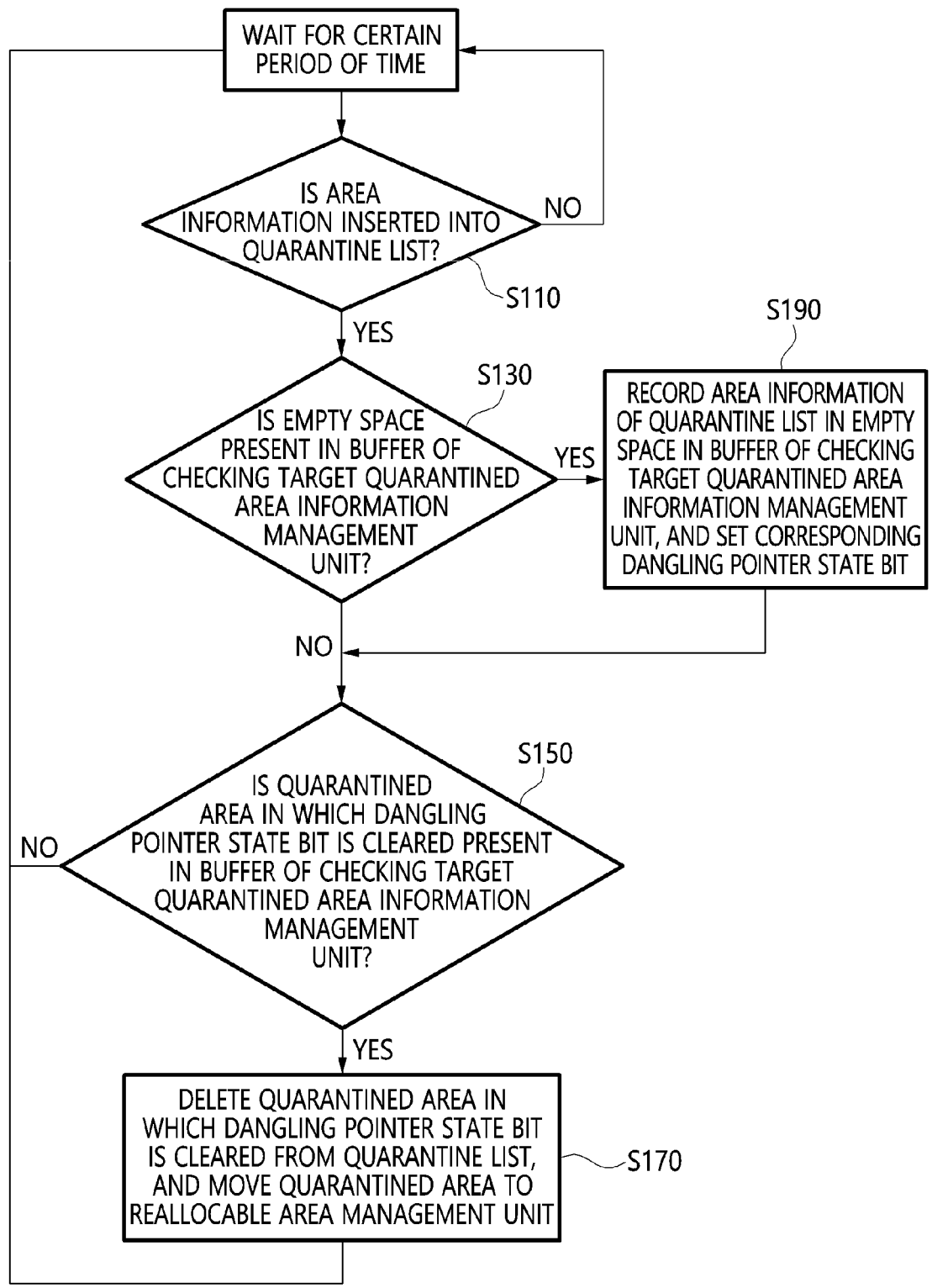
FIG. 2 is a flowchart illustrating operations performed by a heap memory manager according to an embodiment.

FIG. 2 is a flowchart illustrating operations performed by a heap memory manager according to an embodiment.

As illustrated in FIG. 2, the heap memory manager may determine whether area information is inserted into a quarantine list (or a quarantined list) at step S110. When it is determined that area information is not inserted into the quarantine list, the heap memory manager may wait for a certain period of time.

When it is determined that the area information is inserted into the quarantine list, the heap memory manager may determine whether an empty space is present in the buffer CSR (control and status register)_quarantined_chunks of the checking target quarantined area information management unit at step S130.

When no empty space is present in the buffer CSR_quarantined_chunks of the checking target quarantined area information management unit, the heap memory manager may determine whether a quarantined area in which a dangling pointer state bit is cleared is present in the buffer of the checking target quarantined area information management unit at step S150. When the quarantined area in which the dangling pointer state bit is cleared is not present, the heap memory manager may wait for a certain period of time.

When the quarantined area in which the dangling pointer state bit is cleared is present, the heap memory manager may delete the quarantined area in which the dangling pointer state bit is cleared from the quarantine list, and may move the quarantined area to a reallocable area management unit at step S170.

On the other hand, when the empty space is present in the buffer CSR_quarantined_chunks of the checking target quarantined area information management unit, the heap memory manager may record area information of the quarantine list in an empty space in the buffer of the checking target quarantined area information management unit, and may set the corresponding dangling pointer state bit at step S190.

Figure 3:
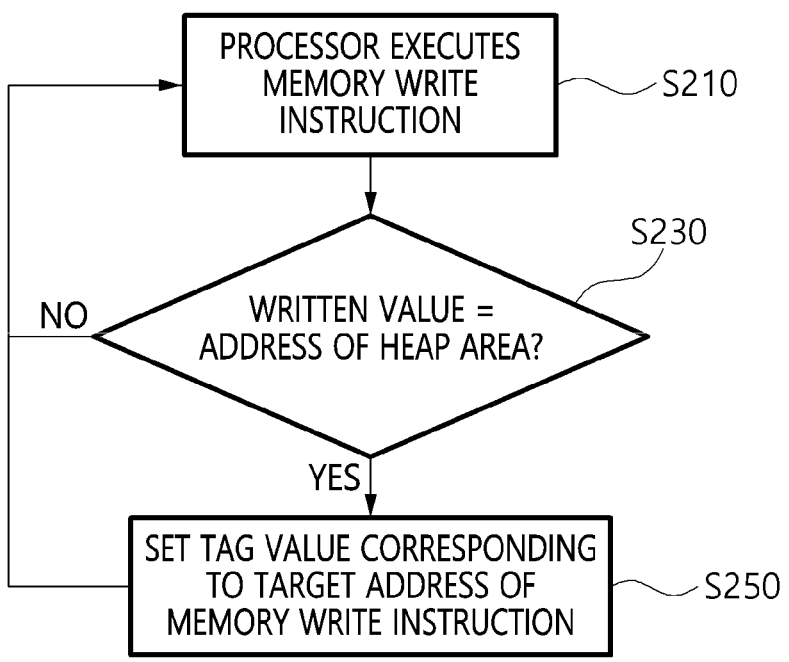
FIG. 3 is a flowchart illustrating operations performed by a dangling pointer detector according to an embodiment.

FIG. 3 is a flowchart illustrating operations performed by a dangling pointer detector according to an embodiment.

As illustrated in FIG. 3, when a processor first executes a memory write instruction at step S210, the dangling pointer detector may determine whether a written value corresponds to the address of a heap area at step S230. The dangling pointer detector may set a tag value corresponding to the target address of the memory write instruction at step S250.

Figure 4:
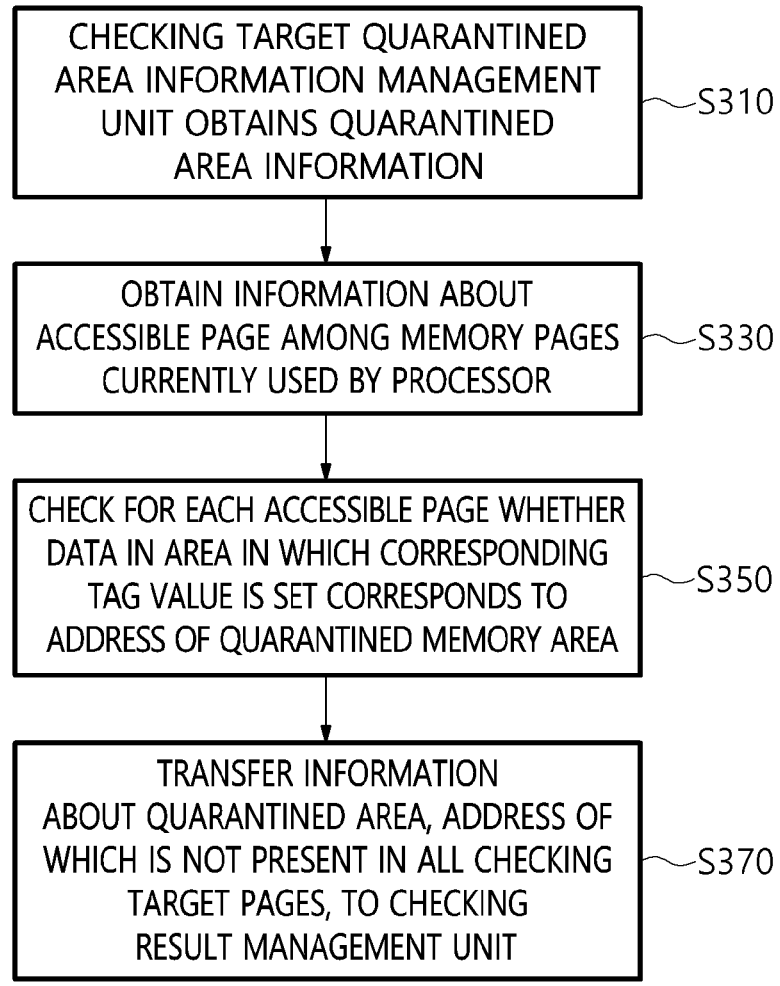
FIG. 4 is a flowchart illustrating detailed operations performed by the dangling pointer detector according to an embodiment.

FIG. 4 is a flowchart illustrating detailed operations performed by the dangling pointer detector according to an embodiment.

As illustrated in FIG. 4, the checking target quarantined area information management unit of the dangling pointer detector may obtain quarantined area information at step S310. The dangling pointer checking unit may obtain information about an accessible page among memory pages currently used by the processor at step S330. The dangling pointer checking unit may check for each accessible page whether data in the area in which the corresponding tag value is set corresponds to the address of the quarantined memory area at step S350. The dangling pointer checking unit may transfer information about the quarantined area, the address of which is not present in all checking target pages, to the checking result management unit at step S370.

Figure 5:
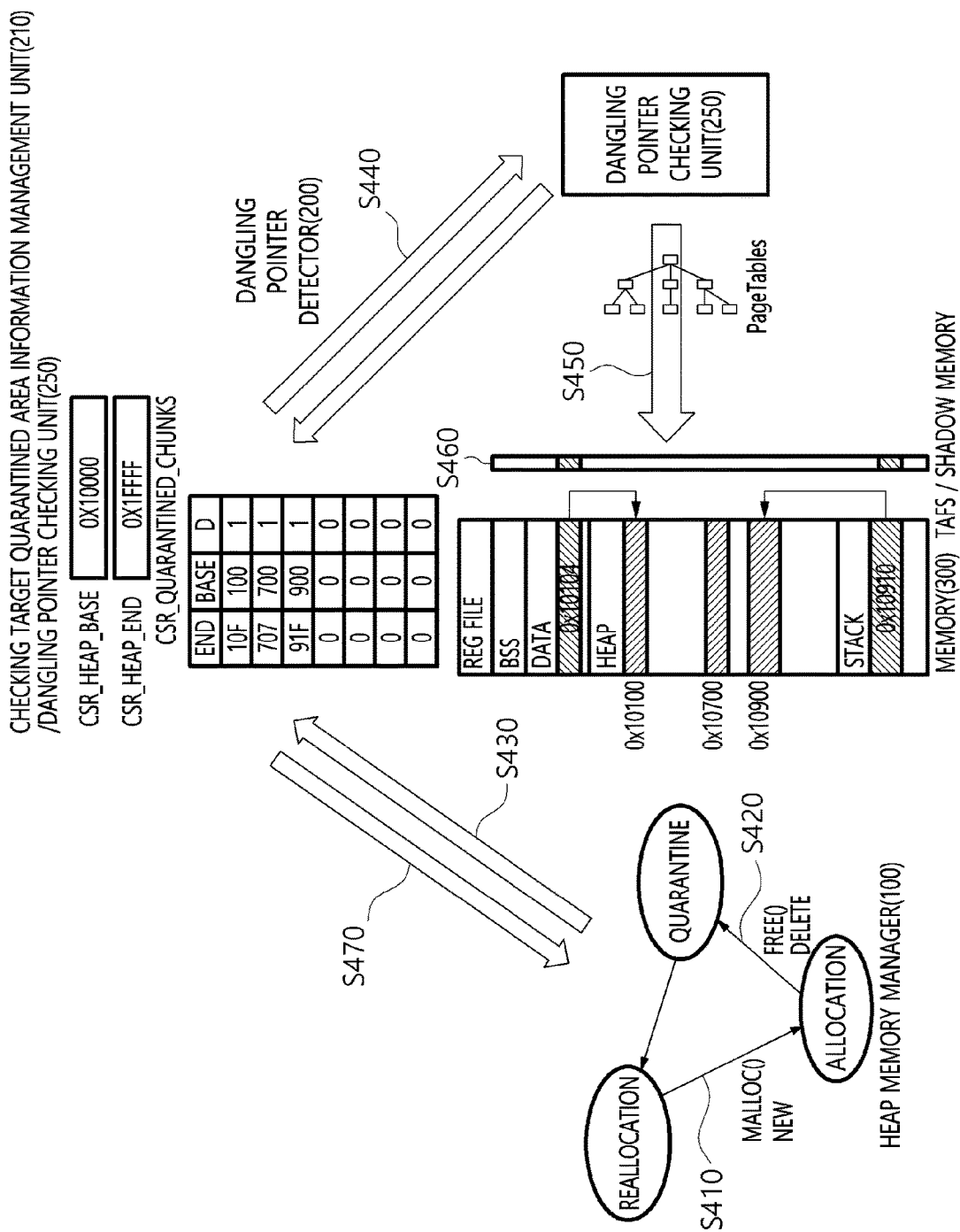
FIG. 5 is a diagram illustrating a garbage collection method according to an embodiment.

FIG. 5 is a diagram illustrating a garbage collection method according to an embodiment.

As illustrated in FIG. 5, when an area dynamically allocated through a malloc( ) function or a new operator of a standard C library is deallocated through a free( ) function or a delete operator at step S410, a heap allocator may insert the deallocated area into a quarantine list (or quarantined list) rather than maintaining the deallocated area in a free state which reallocation is enabled at step S420.

The heap memory manager 100 may record the base address (i.e., starting address) and the end address of each of areas inserted into the quarantine list in a CSR_quarantined_chunks register, which is the buffer of the checking target quarantined area information management unit at step S430.

The CSR_quarantined_chunks register includes multiple 64-bit registers, each of which may be composed of the virtual base address, the virtual end address, and the state flag bit of the corresponding quarantined memory area. Here, the base address and the end address may refer to relative addresses to the values of a CSR_HEAP_BASE register having virtual base addresses of the entire heap area.

Further, the state flag bit (D) may have a value of 1 when the corresponding memory area is in a quarantined state, and may be changed to 0 when it is determined by the dangling pointer detector that the corresponding memory area does not have a dangling pointer.

Figure 6:
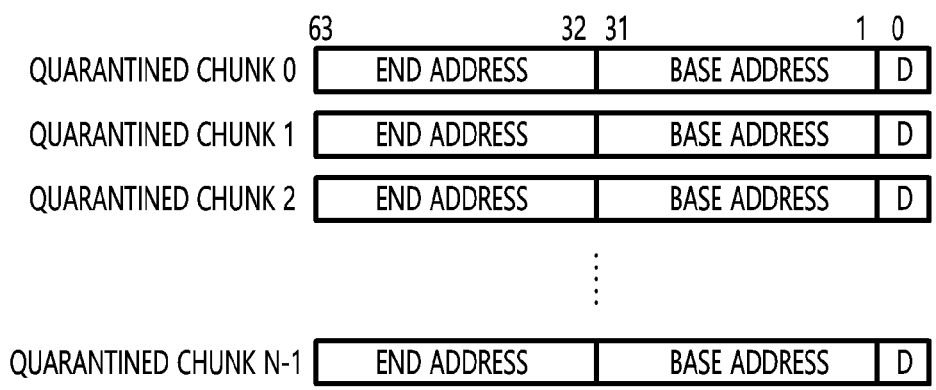
FIG. 6 is a diagram illustrating an example of a CSR_quarantined_chunks register according to an embodiment.

FIG. 6 is a diagram illustrating an example of a CSR_quarantined_chunks register according to an embodiment.

As illustrated in FIG. 6, the CSR_quarantined_chunks register may be composed of an end address, a base address, and a state flag bit.

Referring back to FIG. 5, the dangling pointer detector 200 may find the physical address of a memory page used by the current process through a method such as page table search at step S440, and may search pieces of data in the memory page for a value included in the quarantined area of the CSR_quarantined_chunks register at step S450. The area in which values included in the quarantined area are not present in all pages in use may be determined to have no dangling pointer, and thus the state flag bit of the corresponding CSR_quarantined_chunks register may be set to 0.

Here, in order to improve search efficiency for the dangling pointer, a 1-bit tag may be added for each specific size of the memory (e.g., 8 bytes), or shadow memory may be allocated and utilized as the tag at step S460. The tag value may be initialized to 0, and may be set to 1 when a value between values of CSR_HEAP_BASE and CSR_HEAP_END is written to the memory in execution. Further, in the case of the heap area, when a specific area is deallocated through a free( ) function or the like, the value of the corresponding tag may be initialized to 0. Further, the tag value of a stack area is initialized for a stack area that is no longer used while changing a stack pointer value upon returning the function.

Figure 7:
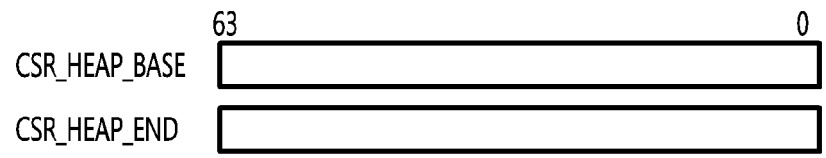
FIG. 7 is a diagram illustrating examples of CSR_HEAP_BASE and CSR_HEAP_END registers according to an embodiment.

FIG. 7 is a diagram illustrating examples of CSR_HEAP_BASE and CSR_HEAP_END registers according to an embodiment.

As illustrated in FIG. 7, the CSR_HEAP_BASE register may be implemented as a 64-bit register, and the CSR_HEAP_END register may also be implemented as a 64-bit register.

Referring back to FIG. 5, the dangling pointer detector 200 only needs to read a value in a memory area in which the tag value is set to 1 when searching a memory page currently used by the process for the dangling pointer, thus enhancing search efficiency.

The heap memory manager 100 may delete an area in which the value of the state flag is 0, among areas corresponding to CSR_quarantined_chunks, from the quarantine list, and may insert the area into a free list in which reallocation is enabled at step S470.

The heap memory manager 100 may delete an area in which the value of the state flag is 0, among the areas corresponding to CSR_quarantined_chunks, from the quarantine list, and may insert the area into the free list in which reallocation is enabled at step S480. The area in the CSR_quarantined_chunks register in which the value of the state flag is 0 may be replaced with information of another area of the quarantine list.

A process of changing a tag value and values in the CSR_quarantined_chunks register will be described below using the program according to an embodiment by way of example.

FIG. 8 is a diagram illustrating an example of a program according to an embodiment, and FIGS. 9 to 14 are diagrams illustrating stacks, heaps, and tag values in the program and illustrating changes in the CSR_quarantined_chunks register corresponding thereto.

Figure 9:
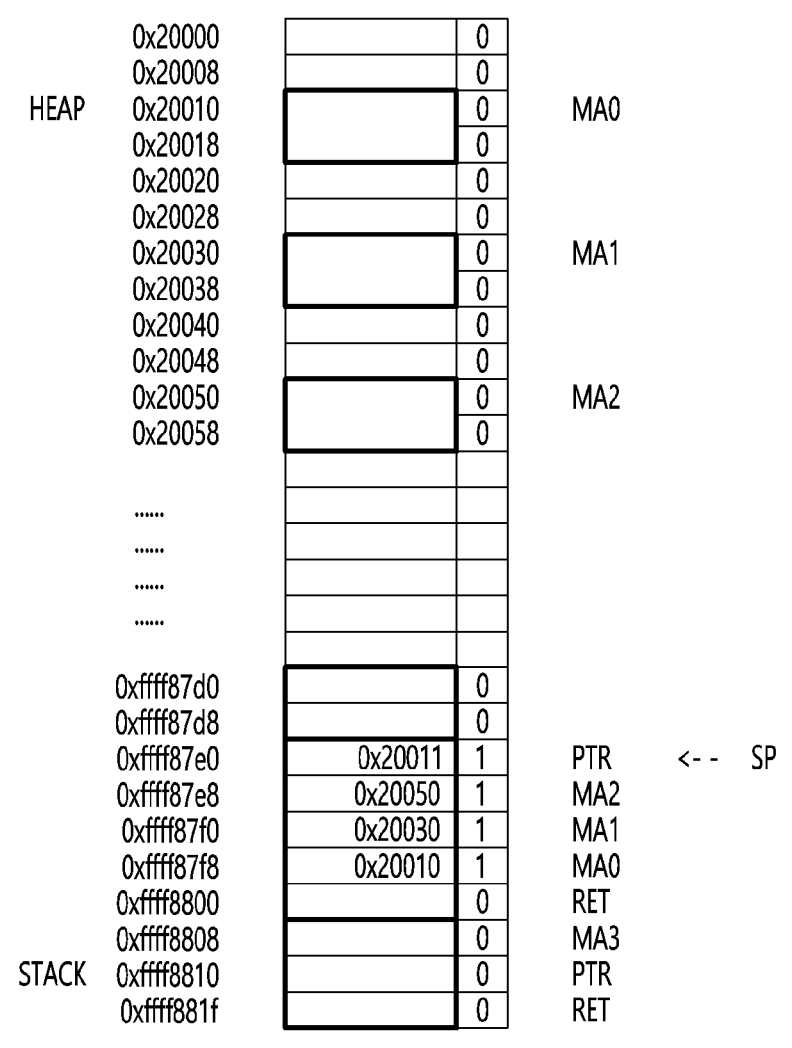

As illustrated in FIG. 9, at a time at which the program is executed up to position (1), local variables ma0, ma1, ma2, and ptr of func0 are located in a stack, and the stack has the address of a deallocated heap area by invoking a malloc( ) function. Further, the tag values thereof may be set to 1.

As illustrated in FIG. 10, at a time at which the program is executed up to position (2), the local variable lptr of func is located in the stack, and the stack has the value of a heap area, whereby the tag value may be set to 1.

As illustrated in FIG. 11, at a time at which the program is executed up to position (3), the function is returned from func to func0 while the tag value of the local variable lptr of the stack is initialized to 0. Further, while the value of ptr is recorded in a heap area ma2, the tag value of the corresponding heap area may be set to 1.

As illustrated in FIG. 12, at a time at which the program is executed up to position (4), the tag value of the heap area ma2 is initialized to 0 as a result of invoking a free( ) function for heap areas ma0, ma1, and ma2. Then, information about three deallocated heap areas is inserted into the CSR_quarantined_chunks register. In this case, the state flag bits (D) of all of the three areas are 1.

As illustrated in FIG. 13, at a time at which the program is executed up to position (5), the function is returned from func0 to a main function while all of the tag values of the local variables of func0 located in the stack are initialized to 0. Furthermore, while the returned value of the function func0 is written to the local variable ptr of the main function located in the stack, the corresponding tag value is set to 1. Here, because ptr points at the previously deallocated heap area ma0, ptr is the dangling pointer. Furthermore, among the three areas of the CSR_quarantined_chunks register, the state flag bit of the area ma0 is maintained at 1 by ptr. Because the remaining two areas have no dangling pointers, they are initialized to 0 and are inserted into the free list in which reallocation is enabled.

As illustrated in FIG. 14, at a time point at which the program is executed up to position (6), the local variable ma3 of the main function has a value of 0x20030 because the area allocated to ma1 is reallocated as a result of invoking the malloc( ) function. Furthermore, the corresponding area is a quarantined chunk area that cannot be reallocated even though the value is recorded in the heap area through the dangling pointer ptr, whereby the corresponding area cannot be used for attacking.

The garbage collection apparatus according to the embodiment may be implemented in a computer system such as a computer-readable storage medium.

Figure 15:
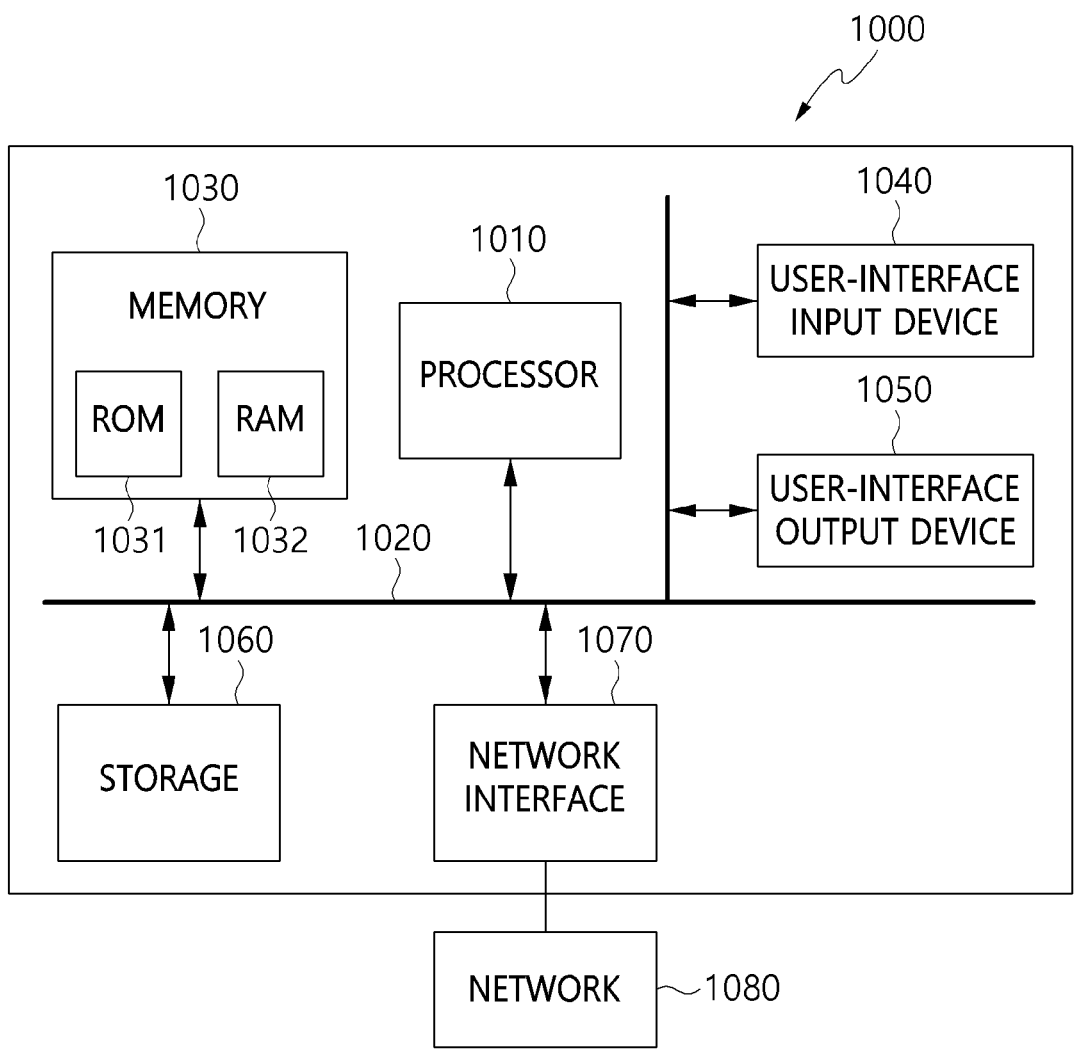
FIG. 15 is a block diagram illustrating the configuration of a computer system according to an embodiment.

FIG. 15 is a block diagram illustrating the configuration of a computer system according to an embodiment.

Referring to FIG. 15, a computer system 1000 according to an embodiment may include one or more processors 1010, memory 1030, a user interface input device 1040, a user interface output device 1050, and storage 1060, which communicate with each other through a bus 1020. The computer system 1000 may further include a network interface 1070 connected to a network 1080.

Each processor 1010 may be a Central Processing Unit (CPU) or a semiconductor device for executing programs or processing instructions stored in the memory 1030 or the storage 1060. The processor 1010 may be a kind of CPU, and may control the overall operation of the garbage collection apparatus.

The processor 1010 may include all types of devices capable of processing data. The term processor as herein used may refer to a data-processing device embedded in hardware having circuits physically constructed to perform a function represented in, for example, code or instructions included in the program. The data-processing device embedded in hardware may include, for example, a microprocessor, a CPU, a processor core, a multiprocessor, an Application-Specific Integrated Circuit (ASIC), a Field-Programmable Gate Array (FPGA), etc., without being limited thereto.

The memory 1030 may store various types of data for the overall operation such as a control program for performing a garbage collection method according to an embodiment. In detail, the memory 1030 may store multiple applications executed by the garbage collection apparatus, and data and instructions for the operation of the garbage collection apparatus.

Each of the memory 1030 and the storage 1060 may be a storage medium including at least one of a volatile medium, a nonvolatile medium, a removable medium, a non-removable medium, a communication medium, an information delivery medium or a combination thereof. For example, the memory 1030 may include Read-Only Memory (ROM) 1031 or Random Access Memory (RAM) 1032.

The particular implementations shown and described herein are illustrative examples of the present disclosure and are not intended to limit the scope of the present disclosure in any way. For the sake of brevity, conventional electronics, control systems, software development, and other functional aspects of the systems may not be described in detail. Furthermore, the connecting lines or connectors shown in the various presented figures are intended to represent exemplary functional relationships and/or physical or logical couplings between the various elements. It should be noted that many alternative or additional functional relationships, physical connections, or logical connections may be present in an actual device. Moreover, no item or component may be essential to the practice of the present disclosure unless the element is specifically described as "essential" or "critical".

Embodiments are advantageous in that efficient garbage collection for low-level languages such as C or C++ is provided, thus preventing attacks using heap vulnerabilities.

Therefore, the spirit of the present disclosure should not be limitedly defined by the above-described embodiments, and it is appreciated that all ranges of the accompanying claims and equivalents thereof belong to the scope of the spirit of the present disclosure.

What is claimed is:

1. A garbage collection method, comprising:
deallocating an area dynamically allocated through a malloc function or a new operator of a standard C library through a free function or a delete operator, thereby inserting the deallocated area into a quarantine list;
recording a base address and an end address of each of areas inserted into the quarantine list in a CSR (control and status register)_quarantined_chunks register;
finding a physical address of a memory page used by a processor and searching pieces of data in the memory page for a value included in a quarantined area of the CSR_quarantined_chunks register;
determining a value included in the quarantined area of the CSR_quarantined_chunks register is not present, thereby setting a state flag bit of the CSR_quarantined_chunks register to 0; and
deleting an area which the state flag bit of the CSR_quarantined_chunks register is 0 from the quarantine list, and inserting the area into a free list in which reallocation is enabled, wherein, to improve search efficiency of dangling pointers, the tag value is configured such that a 1-bit tag value is added for each specific size of a memory or such that a shadow memory is allocated and used as a tag value.

2. The garbage collection method of claim 1, wherein the CSR_quarantined_chunks register includes a virtual base address, a virtual end address, and a state flag bit of each quarantined memory area.

3. The garbage collection method of claim 1, wherein the state flag bit has a value of 1 in a quarantined state, and is changed to 0 when no dangling pointer is determined to be present.

4. The garbage collection method of claim 1, wherein the tag value is initialized to 0 and is set to 1 when a value between values of CSR_HEAP_BASE and CSR_HEAP_END is written to the memory in execution.

5. The garbage collection method of claim 1, wherein a tag value of a heap area is initialized to 0 when a specific area is deallocated through a free function.

6. The garbage collection method of claim 1, wherein a tag value of a stack area is initialized for a stack area that is no longer used while changing a stack pointer value when a function is returned.

7. A garbage collection apparatus, comprising:
   a memory configured to store a control program for performing garbage collection; and
   a processor configured to execute the control program stored in the memory,
   wherein the processor is configured to deallocate an area dynamically allocated through a malloc function or a new operator of a standard C library through a free function or a delete operator, insert the deallocated area into a quarantine list, record a base address and an end address of each of areas inserted into the quarantine list in a CSR (control and status register)_quarantined_chunks register, find a physical address of a memory page used by the processor, search pieces of data in the memory page for a value included in a quarantined area of the CSR_quarantined_chunks register, determine a value included in the quarantined area of the CSR_quarantined_chunks register is not present, set a state flag bit of the CSR_quarantined_chunks register to 0, delete an area which the state flag bit of the CSR_quarantined_chunks register is 0 from the quarantine list, and insert the area into a free list in which reallocation is enabled,
   wherein, to improve search efficiency of dangling pointers, the processor is configured to perform control such that a 1-bit tag value is added for each specific size of a memory or such that a shadow memory is allocated and used as a tag value.

8. The garbage collection apparatus of claim 7, wherein the CSR_quarantined_chunks register includes a virtual base address, a virtual end address, and a state flag bit of each quarantined memory area.

9. The garbage collection apparatus of claim 7, wherein the processor is configured to control the state flag bit such that the state flag bit has a value of 1 in a quarantined state and is changed to 0 when no dangling pointer is determined to be present.

10. The garbage collection apparatus of claim 7, wherein the processor is configured to perform control such that the tag value is initialized to 0 and is set to 1 when a value between values of CSR_HEAP_BASE and CSR_HEAP_END is written to the memory in execution.

11. The garbage collection apparatus of claim 7, wherein the processor is configured to perform control such that a tag value of a heap area is initialized to 0 when a specific area is deallocated through a free function.

12. The garbage collection apparatus of claim 7, wherein the processor is configured to perform control such that a tag value of a stack area is initialized for a stack area that is no longer used while changing a stack pointer value when a function is returned.

* * * * *